(12) United States Patent
Whiting et al.

(10) Patent No.: US 6,618,170 B1
(45) Date of Patent: Sep. 9, 2003

(54) USER INTERFACE COMPRISING HUE SHIFT CONTROL FOR COLOR PRINTING

(75) Inventors: John F. Whiting, Webster, NY (US); Jonathan A. Dorsey, Rochester, NY (US); Andrew T. Martin, Webster, NY (US); David S. Matthews, Rochester, NY (US); Richard A. Sperling, Rochester, NY (US); Richard M. Hraber, Bloomfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/312,356

(22) Filed: May 14, 1999

(51) Int. Cl.$^7$ ............................................... H04N 1/409
(52) U.S. Cl. ........................ 358/1.9; 358/527; 399/81; 399/158; 345/418; 345/581
(58) Field of Search .................... 358/1.9, 527; 399/81, 399/158; 345/581, 838, 418

(56) References Cited

U.S. PATENT DOCUMENTS

| | | | |
|---|---|---|---|
| 5,276,511 A | | 1/1994 | Takemoto |
| 5,953,499 A | * | 9/1999 | Narendranath et al. ...... 358/1.9 |
| 6,333,752 B1 | * | 12/2001 | Hasegawa et al. .......... 345/581 |

FOREIGN PATENT DOCUMENTS

| | | |
|---|---|---|
| EP | 0 773 667 A2 | 5/1997 |
| JP | 63151971 | 6/1988 |
| JP | 01315774 | 12/1989 |
| JP | 10145582 | 5/1998 |

OTHER PUBLICATIONS

Xerox, DocuColor 40 Operator Manual, 1996.*

* cited by examiner

Primary Examiner—Edward Coles
Assistant Examiner—Alan Rahimi
(74) Attorney, Agent, or Firm—Fay, Sharpe, Fagan, Minnich & McKee, LLP

(57) ABSTRACT

A color printer control system comprising a user interface for shifting color hue. A control panel display includes an illustrative representation such as a color spectrum bar for suggesting a color range for both the input document and the output document. The user interface has a selective control such as a slide bar including an indicator of a user preference relative to the color reference bar. The position of the slide bar represents the hue shift input by the user. A dynamic image representation, such as a photograph, concurrently adjusts its hue in accordance with adjustment of the color slide bar and the user command. The dynamic image shifts color hue to provide a more accurate indication of the effects of hue shift to the user.

11 Claims, 7 Drawing Sheets

(5 of 7 Drawing Sheet(s) Filed in Color)

USER INTERFACE COMPRISING HUE SHIFT CONTROL FOR COLOR PRINTING

FIELD OF THE PRESENT INVENTION

The present invention relates to xerography or printing systems, in particularly, those systems having a color print output. More specifically, the subject invention relates to a user interface for selectively adjusting hue of a color print. However, it will be appreciated to those skilled in the art that the invention could be readily adapted for other adjustable features of a print or display output as, for example, chroma, luminescence, or where similar user interfaces are employed to implement operator preferences.

BACKGROUND OF THE PRESENT INVENTION

The printing or display of image information via a printer, copier, or personal computer can be controlled by an operator through a variety of interfaces. Common interfaces comprise a number of systems and devices such as a combination touch pad and display screen, a keypad or a mouse control often accessing a tool bar for icon display of system features and options, all having some capacity for controlling a printer or display. To facilitate operator ease of use of the interface controls, such systems are known to include a representative illustration identifying a consequence of a control command. Such illustrations typically comprise an icon which will represent a state or change of state in response to a user instruction. A common example is a representation of paper size in a copying system as the user adjusts printing output from letter, to A4 to legal or other sizes. A problem with such representative icons is that they fail to communicate an accurate identification of consequences of subtle appearance changes in the output such as may occur in color printing from minor adjustments of the input controls. In particular, an icon representing a system state may fail to adequately communicate an accurate indication of the system output. On the other hand, where a number of controls are being adjusted, an icon identifying relative adjustment away from a preexisting default state, can merely identify a tendency away from the default state, but also cannot accurately and adequately represent the consequence on the output. For example, adjustments in hue control such as hue shift are usually available to a user to satisfy a particular user's preferences. The phrases "hue shift" or "hue control" are used to describe the changes in the attributes of the perceived color by an operator throughout a full color spectrum. Such a spectrum is directly related to different light wave lengths as perceived by a human user and, for example, will comprise a continuous color spectrum comprising red, yellow, green, blue, purple and magenta. See Billmeyer and Saltzman, *Principles of Color Technology*, Second Edition, Chapter 2, "Describing Color "John Wiley and Sons, Inc., 1981.

FIG. 1 shows a prior art implementation of a control interface for a color copier for shifting color hue. The interface comprises a screen on an LCD display also including touch screen controls. In this implementation, concentric color spectrum rings are used to suggest an effect of a user adjustment. More particularly, the inner ring 10 defines a reference of the red, yellow, green, cyan, blue and magenta spectrum as an indicator of how the colors of the original input image should be perceived by the copier system.

The outer ring 12 comprises an identical spectrum which at a default state is exactly aligned with the inner ring to indicate that the output print will have an identical system hue as the input hue. However, a user upon checking the print output, may determine that the output hue is unacceptable or improvable. As a practical matter, most users will endeavor to shift color hue in an effort to improve skin tone of the output print image, but present systems provide no representative image which is more accurately indicative of how the shift will affect the overall output, and the user will often have to step through a number of copy operations until, by trial and error, an acceptable print output is obtained. Without such trial and error operations, it is very difficult for an operator to envision changes to a color hue as they are implemented throughout the entire spectrum of output print colors merely as a consequence of trying to improve a skin tone so that such effort can be a tedious problem to overcome.

More specifically and with reference to a copying operation, this feature allows a shift in all of the colors towards the adjacent hue. Another example of where this can be useful is when the document being copied does not have quite the correct colors for the application. By touching one of the two arrow buttons (14, 16) one can cause the overall copy colors to be shifted.

The inner color ring 10 represents the colors of the document being copied and rotates to indicate the direction in which the colors shift. The outer ring 12 represents the colors that appear on the copy (not shown). For example, if the right arrow button 14 is selected, the red colors R shift towards the yellow hue Y, blue colors B shift towards the magenta hue M, and green colors G, shift towards the cyan hue C. All colors in between these colors also shift in the same direction.

If the left arrow button 14 is selected, the red colors R shift towards the magenta hue M, blue colors B shift towards the cyan hue C, and green colors G shift towards the yellow hue Y. Again, all colors in between these colors also shift in the same direction.

The interface system of FIG. 1, although suggesting a shift in color hue, fails to apprise a user of an accurate consequence of the shift for an adequate determination of how much or how little shift is appropriate. Trial and error must be used.

The present invention contemplates a new and improved hue shift control system which overcomes the problems referenced above and others to provide a new color controller which is simple in design, readily understandable by a user, easy to operate, and which provides improved communication of hue shift commands with reference to a dynamic image representation of a print output.

A BRIEF SUMMARY OF THE INVENTION

In accordance with the present invention, there is provided a control system for a color printer or copier including a user interface for selectively adjusting a print output. The system comprises an illustrative representation of an adjustable color spectrum suggesting to the user a color range for the output. The user interface also has a selective control including an indicator of the user input command and for representing an effect of the user command on the output. A dynamic image representation suggesting the effect on the print output concurrently communicates an adjustment in the appearance of the print output in accordance with the implementation of the user commands. The image representation thus provides a good indicator to the user of the effect of a change in hue command across the whole entirety of the color spectrum so that the user can more quickly and efficiently identify the likely effects of such control commands on the print output.

In accordance with another aspect of the present invention, the selective control comprises a slide bar suggestive of the color hue spectrum. A touch-sensitive mechanism overlay allows the user to implement commands so that the slide bar moves relative to the representation of the color spectrum to suggest to the user the consequences in hue shift as a result of the input control command.

In accordance with a further aspect of the present invention, the dynamic image representation includes a skin tone portion displayed in an environment substantially including the rest of the color spectrum. The consequence of hue shift commands can thus be perceived by the user not only with reference to the skin tone of the image representation but of the effects on other portions of the image representation.

In accordance with another aspect of the present invention, both the indicator and the dynamic image representation concurrently communicate consequences of the user commands to jointly indicate to the user the probable consequences of the commands on the print output.

In accordance with yet another aspect of the present invention, the interface includes a selective default setting for a relative setting of the hue control.

One benefit obtained by use of the present invention is a control system wherein the user interface provides a dynamic image representation as part of a display or control panel wherein a direct indication is displayed of the effect of a change or shift in the feature of the output resulting from the user command. The image is represented in concert with a reference representation of a spectrum of printed attributes for accurately communicating an identified change in a basic spectrum relative to the associated image representation.

Another benefit obtained by use of the present invention is a control system which provides improved communication of the effects in hue shifts. When a user shifts overall copier or print color to an adjacent hue, the effect of the color shift on the entire spectrum is appreciable along with the likely consequence of the change in appearance of a print output.

A more limited benefit of the subject invention is that the controller has a default position for a predetermined standard position for the controller, which standard position also is easily understood and represented by the user interface and image representation.

Other benefits and advantages for the subject new user interface and printer controller will become apparent to those skilled in the art upon a reading and understanding of the specification.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

The file of this patent contains at least one drawing executed in color. Copies of this patent with color prints will be provided by the Patent and Trademark Office upon request and payment of the necessary fee.

Figure 1:
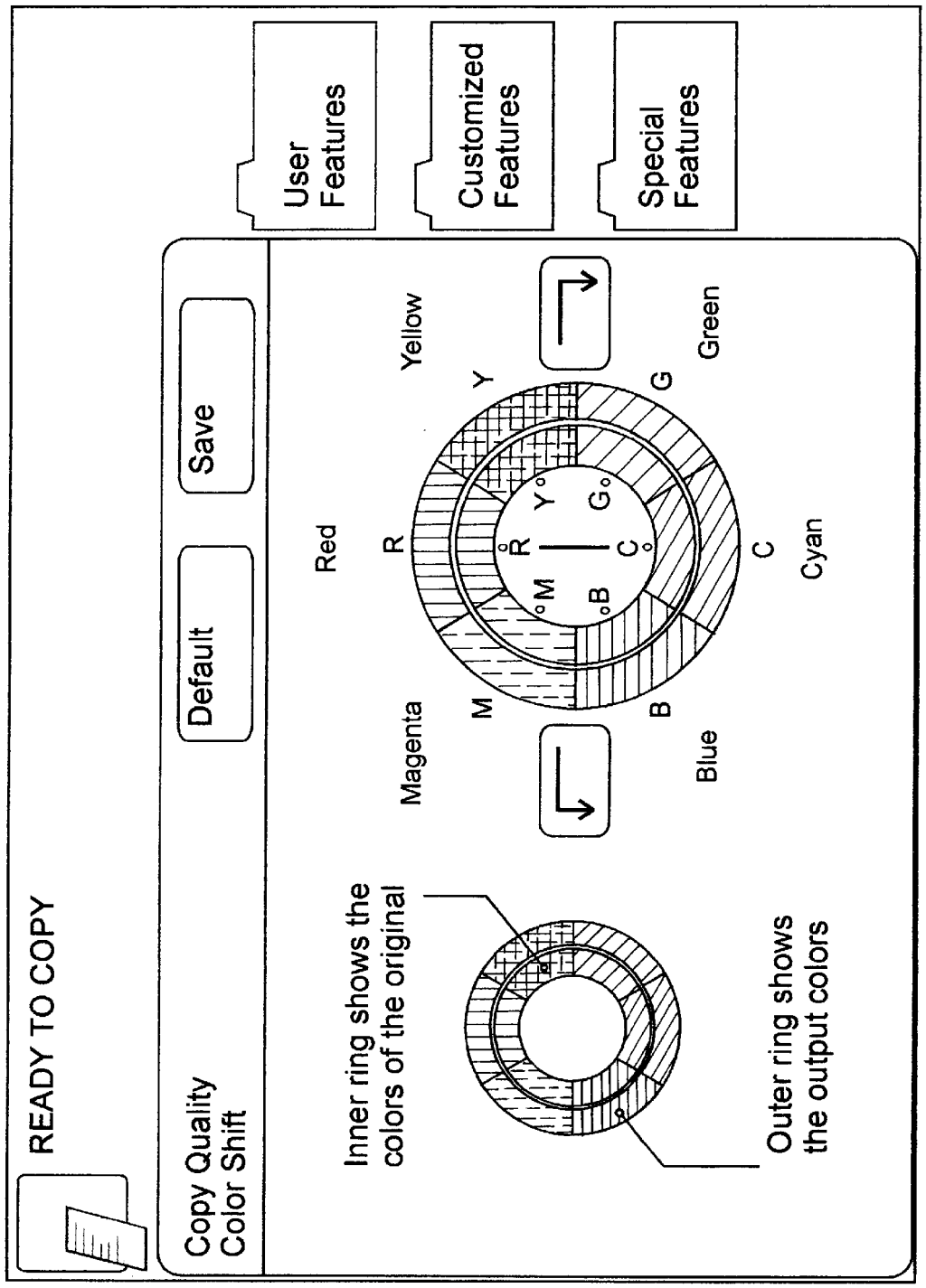
Figure 2:
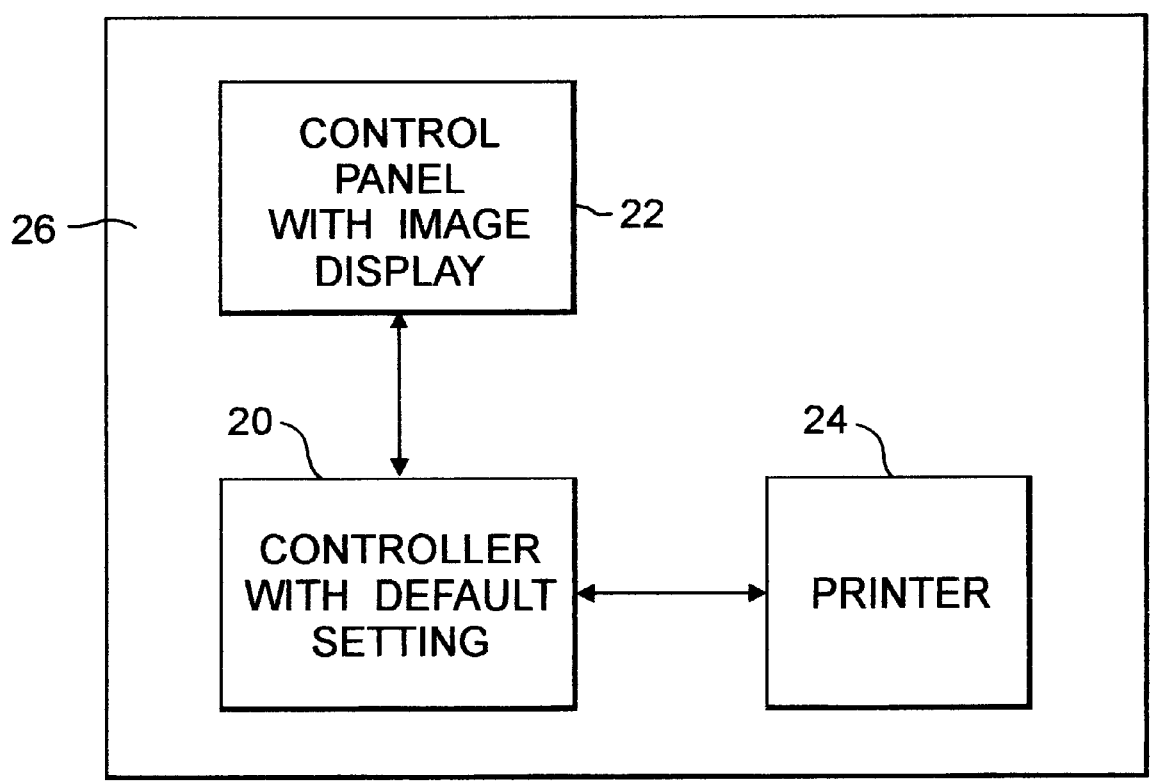

The invention may take physical form in certain parts and arrangements of parts and certain display features and arrangements of the displayed feature, the preferred embodiments of which will be described in detail in the specification and illustrated in accompanying drawings which form a part hereof and wherein:

FIG. 1 is a schematic view of a prior art color shift/hue control for a well known xerographic copier;

FIG. 2 is a block diagram of a control system incorporating the present invention; and, FIGS. 3A–3E are color prints illustrating a control display when shifts in color hue of are made.

DETAILED DESCRIPTION OF THE INVENTION

Referring now to the drawings wherein the showings are for purposes of illustrating the preferred embodiments of the invention only and not for purposes of limiting same, the FIG. 2 shows a color shift controller 20 including a control panel/display 22 to be used as a user interface for controlling color hue in a printer output 24 such as is useful in a color copier 26 or the like.

Figure 3A:
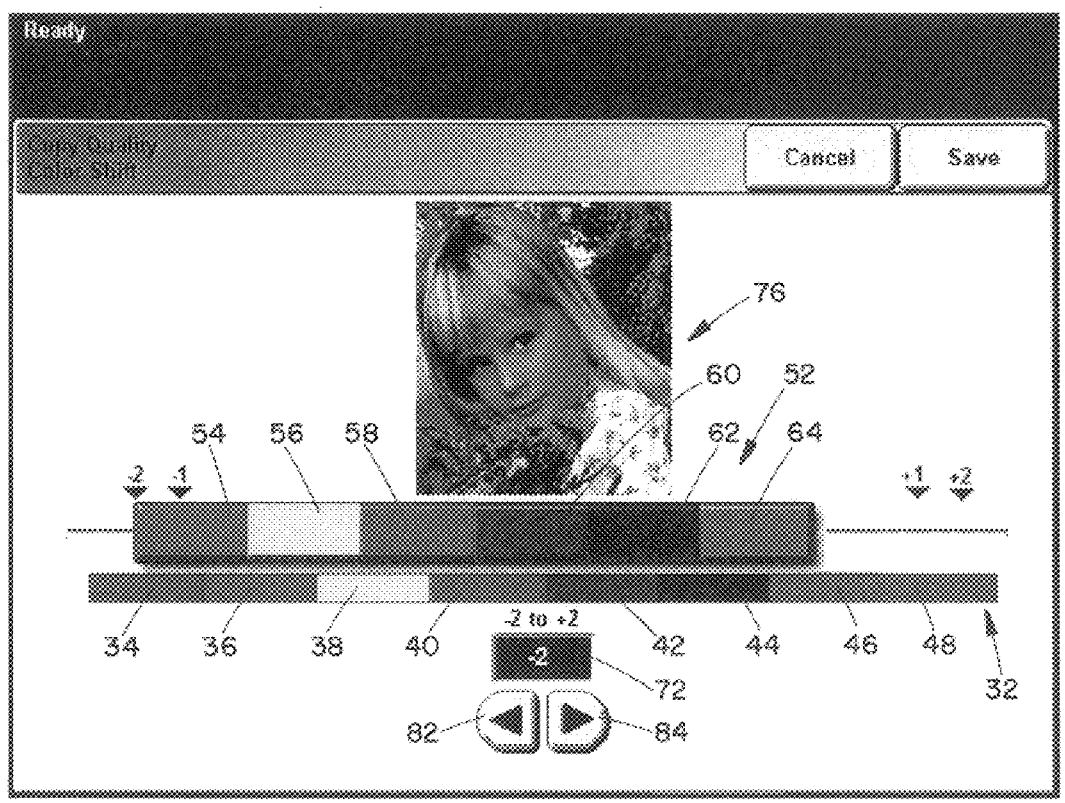
Figure 3B:
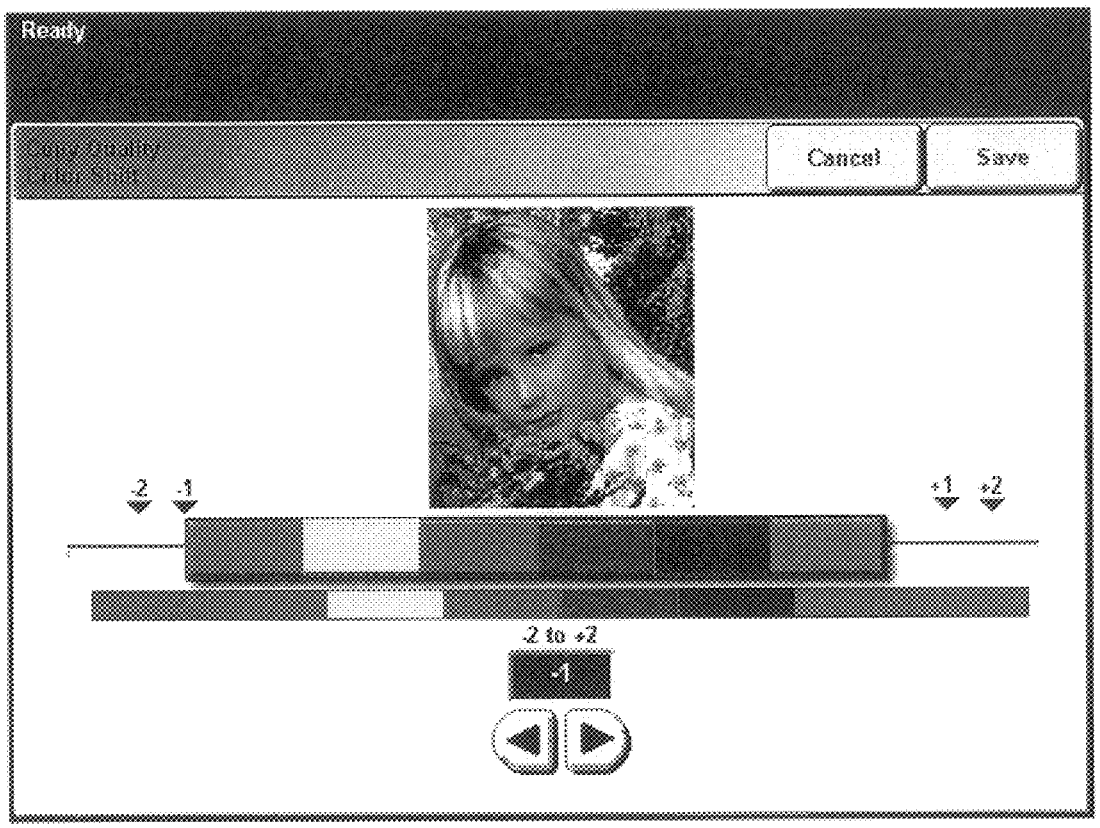

With particular reference to FIG. 3A, a specific embodiment of the control panel 22 is shown. Such a control panel typically comprises an LCD display comprising an integral part of the copier 26; however, other displays are possible such as a CRT.

In contrast to FIG. 1, the spectrum of color hue representing the colors of the document being copied are presented in the form of a bar, as opposed to a ring. In actual fact, the spectrum is of course continuous so that a circle may be considered a more accurate representation of the spectrum. However the bar 32 comprises an overlap in colors for conveying this aspect. More particularly, the bar as shown identifies the range as magenta 34, red 36, yellow 38, green 40, blue 42, purple 44 and then magenta 46 and red 48 are repeated. The bar 32 is fixed but comprises an illustrative representation of an adjustable color spectrum thereby suggesting a color range of an appearance of the output to the user. In other words, all the colors on the document that is being copied are presented to the user by the spectrum bar 32. Slide bar 52 also comprises a complete spectrum of color comprised of color blocks sized identically to the reference bar 32 and range from red 54, yellow 56, green 58, blue 60, purple 62, and magenta 64. Slide bar 52 moves in parallel relative motion to color bar 32 and in the form of this particular display has five relative positions relative to 25 the color bar 32. These positions are displayed as −2,−1, 0,+1 and +2. These relative positions are shown in FIGS. 3A–3E, respectively.

Figure 3C:
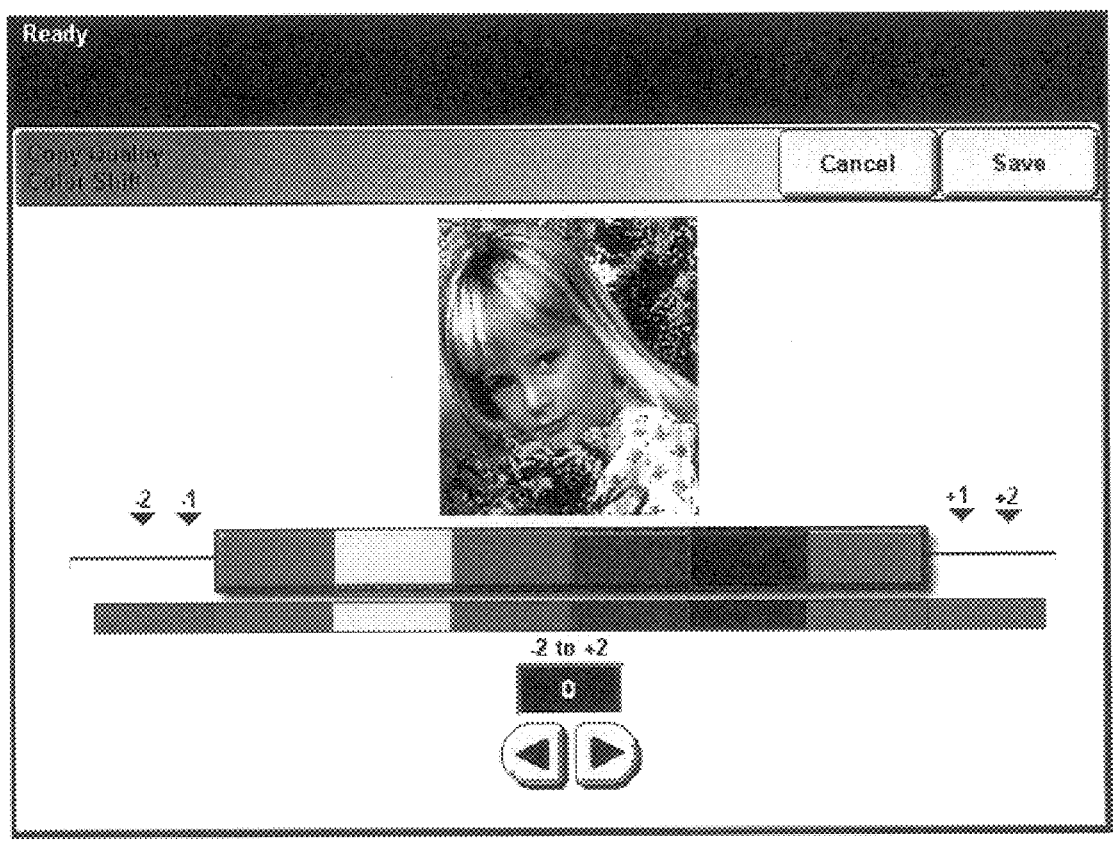

FIG. 3C illustrates the factory default setting wherein the slide bar 52 is aligned at a "0" position so that the output print is intended to exactly match the perceived colors of the document being copied. In other words, the system intends to exactly match the hue of the input document and the output document. In the position of FIG. 3C, it can be seen that the color blocks of each slide bar are directly aligned in adjacent positions to indicate that the reds, yellows, greens, etc. Of the input document should exactly match the reds, yellows, greens, etc. Of the output document. The fact that the system is set at factory default, or the "0" position is indicated in the display box 72 where the "0" is indicated.

Figure 3D:
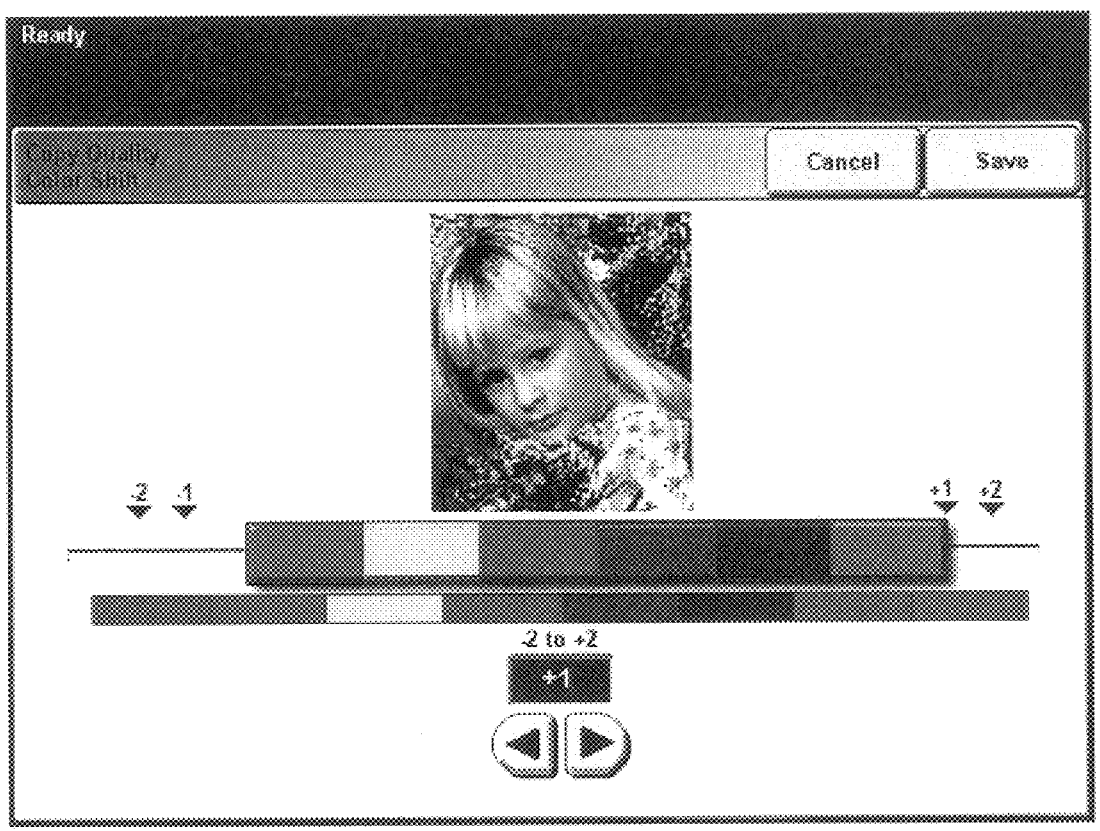
Figure 3E:
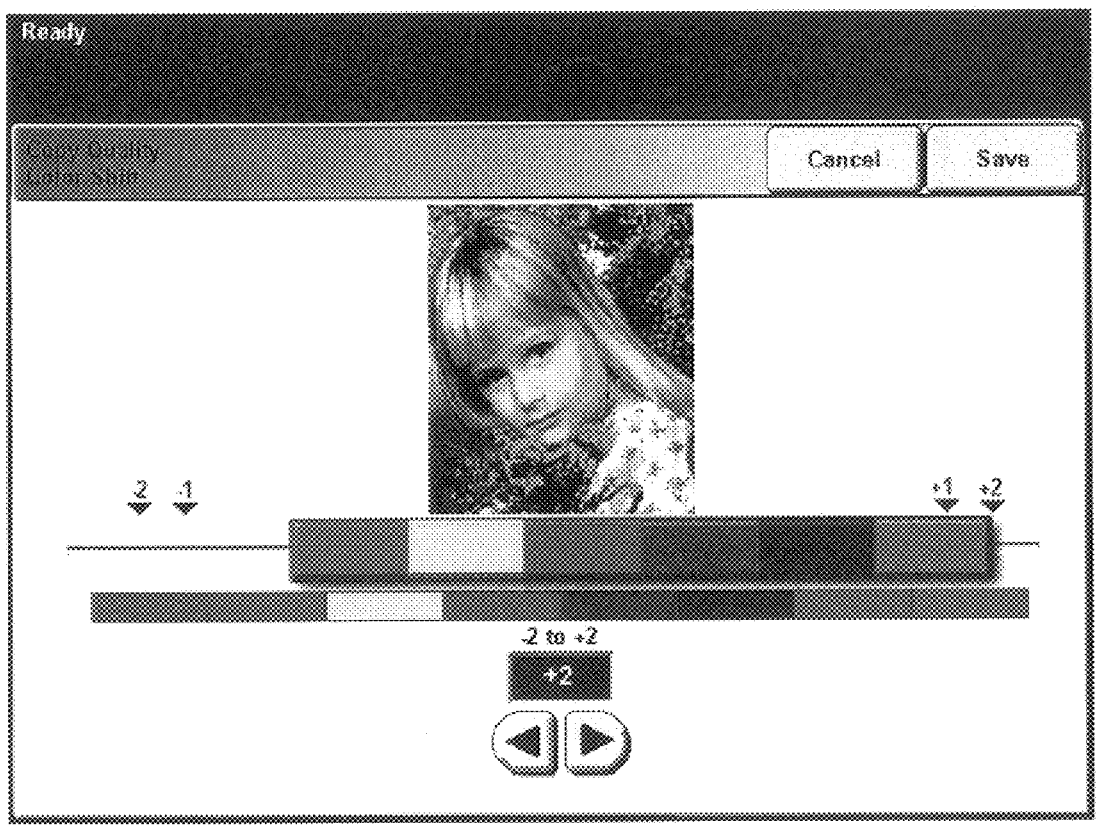

More importantly, though, a dynamic image representation 76 is also included within the display 22 comprising an actual picture preferably illustrating a skin-tone color as well as a spectrum of other colors. The effect of the picture representation 76 is that the adjustment communicated by the operator can now more accurately represent the effect of hue shifts on the overall picture and can be communicated and perceived in combination with relative movements between color bars 32 and 52. A hue shift is affected by an operator touching the touch pads 82, 84, so that the slide bar 52 can move to one of the five positions relative to spectrum bar 32 as noted above. With reference to FIGS. 3C and 3D, if the operator moves the slide bar 52 from the default or neutral position as shown in FIG. 3C, to the "+1" position shown in FIG. 3D, the effect of the hue shift is that the reds will become more yellow, the yellows will become more green, the greens will become more blue, the blues will become more purple, the purples will become more magenta and the magentas will become more red. In one aspect, the invention indicates this as a result of the shift in overlap between the two bars 52, 32, but in a more clear manner than is conveyed by the concentric ring arrangement shown in FIG. 1.

The definition of the relative shift between −2, −1, 0, +1 and +2 positions provides an easily identifiable first communication technique for hue shift. More importantly though, the inclusion of the image 76 allows an operator to quickly and accurately appreciate the effect of the hue shift commands. The reference image 76 thus provides an important additional reference point to the concurrent movement of the slide bar 52. The subject invention comprises a control mechanism operating as a user interface for shifting the color hue wherein the color mechanism is accompanied by a photograph, serving as a reference image, that changes in accordance with the commands to shift the hue and more accurately reflect the changes requested by the user.

Another feature of the invention is that of the five different settings of the slide bar 52 any one of the modes, not necessarily the factory default setting of "0", could be set as a default position. Implementation of the adjustable default is accomplished through a tools dialog represented in the tool bar section of the display 22.

In addition, although a touch pad 82, 84 implementation has been shown as the preferred embodiment, the subject control mechanism could be implemented through a mouse or a finger slide.

The invention has been described with reference to the preferred embodiments. Obviously, modifications and alterations will occur to others upon the reading and understanding of the specification. It is our intention to include all such modifications and alterations insofar as they come within the scope of the appended claims or the equivalents thereof

Having thus described our invention, we now claim:

1. A control system for a color printing apparatus including a user interface for selectively adjusting a print output, the system comprising:

an illustrative representation of an adjustable color spectrum suggesting a color range of an appearance of the output;

the user interface having a selective control including an indicator of a user preference for representing an effect of the user preference on the output and with respect to the suggested color range; and a dynamic image representation of the effect on the print output for communicating an adjustment in the appearance of the print output in accordance with the control of the user preference.

2. The control system as defined in claim 1 wherein the adjustable output comprises a color hue.

3. The control system as defined in claim 2 wherein the selective control comprises a slide bar suggestive of a color hue spectrum.

4. The control system as defined in claim 3 wherein the selective control comprises a user interface display device having a touch-sensitive mechanism or overlay.

5. The control system as defined in claim 1 wherein the dynamic image representation includes a skin tone portion displayed in an environment including a full representation of the color spectrum.

6. The control system as defined in claim 5 wherein the indicator and the dynamic image concurrently communicate the selectively adjusting by the user.

7. The control system as defined in claim 1 wherein the user interface comprises a selective default setting for the spectrum and the image representation.

8. The copier as defined in claim 3, wherein the slide bar moves in parallel relative motion to the suggested color range.

9. A color copier including a user interface for shifting hue on an output copy, comprising:

the user interface having a display including a reference spectrum, an adjustable spectrum disposed relative to the reference spectrum for indicating a shift in hue by selective positioning relative to the reference spectrum, and a reference image wherein the image is concurrently adjusted in hue with the selective positioning of the adjustable spectrum for representing hue shift in the output copy, and a control apparatus for inputting a user command for the hue shift.

10. The copier as defined in claim 9 wherein the interface further includes predetermined positions for the selective positioning of the adjustable spectrum.

11. The copier as defined in claim 10 wherein the interface farther includes a visual indicator of the predetermined positions comprising a numeric indicator.

* * * * *